Nov. 11, 1969 C. M. MELAS 3,478,267

RECEPTION OF PULSES TRANSMITTED AT N TIMES THE NYQUIST RATE

Filed Sept. 9, 1965

INVENTOR
CONSTANTIN MICHAEL MELAS

Maurice H. Klitzman
ATTORNEY

United States Patent Office 3,478,267

Patented Nov. 11, 1969

3,478,267

RECEPTION OF PULSES TRANSMITTED AT N TIMES THE NYQUIST RATE

Constantin Michael Melas, Antibes, France, assignor to International Business Machines Corporation, Armonk, N.Y., a corporation of New York Filed Sept. 9, 1965, Ser. No. 486,084
Claims priority, application France, Sept. 10, 1964, 7,464
Int. Cl. H04b 1/10
U.S. Cl. 325—42 6 Claims

ABSTRACT OF THE DISCLOSURE

This invention relates to a method and means for transmitting pulse information in a restricted bandpass data channel at an integer rate, 2 times or greater than the Nyquist symbol rate for said channel. This is accomplished by transmitting pulse data at such a rate, resulting in a naturally occurring multi-level waveform due to intersymbol interference of the data. This waveform is then detected at the receiver by detecting means utilizing an N position shift register, when N is the integer number (2 or greater) times the Nyquist symbol rate at which the pulse information was transmitted.

This invention relates to telegraph signal reception, and more particularly to a method and means for detecting binary signals transmitted at speeds exceeding that heretofore obtainable.

In pulse transmission systems, the transmission speed is related to the bandwidth of the communication channel. The maximum transmission speed through a distortionless line, whose bandwidth is of $f$ cycles, is $2f$ bits per second if the bit identification is performed at reception on a binary basis, i.e., two level identifications. This maximum transmission speed is sometimes referred to as the Nyquist speed. Whenever the line transmission speed exceeds the Nyquist speed, data identification through signal detection upon a binary basis is not possible at the receiving end. In these conditions, the received signal goes through a succession of levels which do not correspond on a binary basis to the data transmitted.

In the prior art, effective transmission speeds greater than the Nyquist speed were obtained by encoding the binary data to be sent into multi-level pulses at the transmitter. One such prior art device utilized quaternary transmission. Here, the pulses are transmitted at the same rate used for normal binary transmission, but they possess twice the information per pulse since each pulse has four possible amplitudes. Another such prior art technique is the use of biternary transmission whereby three significant levels are transmitted at the same rate used for normal binary transmission. This system also has an effective information rate of two times the Nyquist speed.

However, in order to obtain a gain in information rate by utilizing a system having either quarternary or biternary transmission techniques, it has been necessary to construct both complex encoding devices at the transmitter for converting the binary information pulses into multi-level pulses to be transmitted as well as complex decoding mechanisms at the receiver to decode the transmitted pulses. It has thus been a prior art problem to transmit binary information at transmission speeds exceeding the Nyquist speed without building both complex encoding and decoding mechanisms to convert the binary information into multi-level information and back to binary information.

Accordingly, it is an object of this invention to detect binary information transmitted at a speed greater than Nyquist speed.

It is a further object of this invention to detect binary information transmitted at a speed greater than Nyquist speed from the succession of levels that the received signal goes through.

An additional object of this invention is to detect binary information transmitted at a speed greater than Nyquist speed without encoding the binary information prior to transmission.

The above and further objects of the present invention are carried out by comparing the received signal level with one or several reference levels, which levels can either be significant levels given by the transmission speed and reached or crossed by the received signal, or the levels intermediary to the significant levels, and which are of $2^N$ in number for a transmission speed of N times Nyquist speed. Since the received signal goes through a succession of levels which are generally related to the data already and previously sent through, the reference levels are derived from the data already and previously sent through. For a transmission speed of N times Nyquist speed, the binary values of N data elements are stored and utilized to generate the reference levels.

According to one embodiment of the invention, a signal is transmitted at a speed N times greater than Nyquist speed, the received signal level is detected by threshold detecting means and its equivalent binary information value is obtained by a logic process of combining the signal level detected with signals representative of the effective binary values of the previous N data elements stored.

According to an additional embodiment of the invention, the effective binary information value of the received signal, which has been transmitted at a speed N times greater than Nyquist speed, is detected by comparing the received signal with a variable reference level, the reference level being dependent upon the effective binary value of the previous N pulses transmitted.

The foregoing and other objects, features and advantages of the invention will be apparent from the following more particular description of preferred embodiments of the invention, as illustrated in the accompanying drawings.

Figure 1:
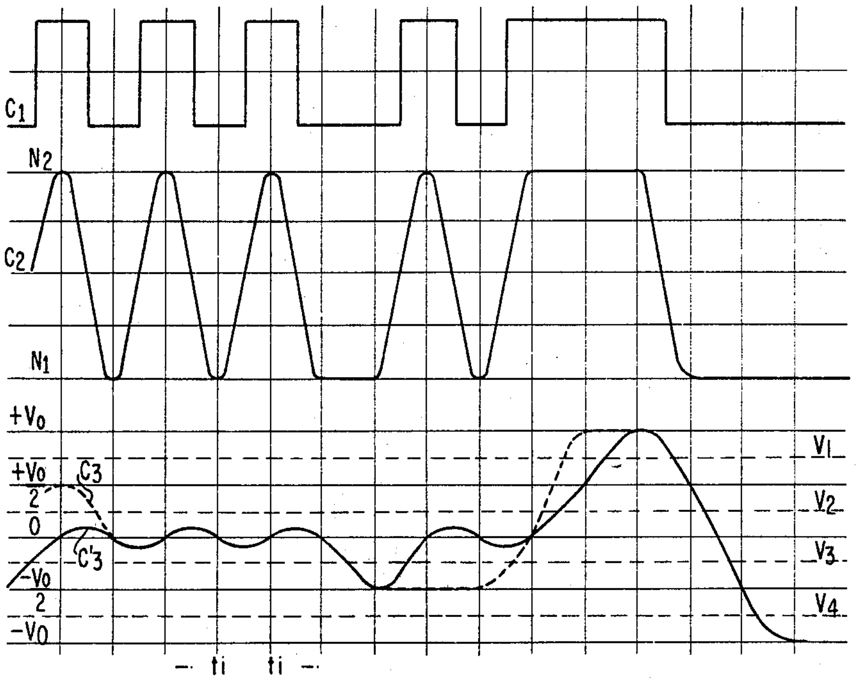
FIG. 1 is an example of a binary message and how it is distorted when transmitted.

Referring now to FIG. 1, plot $C_1$ shows an example of a binary message to be transmitted. Plot $C_2$ shows the corresponding signal as it appears at a receiver when the binary message is transmitted at a speed of $2f$ bits per second where $f$ represents the bandwidth of the communication channel. This is known as the Nyquist speed. At the Nyquist speed, the extreme values of the signal $C_2$ still correspond on a binary basis through its levels $N_1$ and $N_2$ to the binary values sent at the characteristic times $t_i$. Hence, normal binary signal detection can be employed to recover the binary data at the receiving end. Plot $C_3$ shows the corresponding signal as it is received when the transmission is at two times the Nyquist speed. As mentioned in the introduction, the succession of levels that the received signal goes through is such that it is no longer possible to establish a binary correspondence between the binary data transmitted and the signal at the characteristic times $t_i$ by normal binary signal detection. This is because the overall shape of the received signal has more than two levels and, hence, forms a multi-level pulse source due to line distortion. For purposes of this invention, a multi-level pulse is interpreted to mean one having more than two significant information levels.

As shown in plot $C_3$, for a transmission speed at two times the Nyquist speed, the received signal may take five distinct levels at characteristic times $t_i$; the levels being: $+V_0$, $+V_0/2$, 0, $-V_0/2$, $-V_0$. Hence, there are five significant levels. The level of the received signal is dependent upon the preceding and already sent through data. Thus the level of the received signal taken together with the levels of the preceding and already sent through data contained therein determine the true binary value of the instantly received pulse. For purposes of this application, the true binary value of the instantly received signal as determined by the comparison of the instant signal together with the preceding and already sent through data will be referred to hereafter as the "effective binary value" of the instantly received pulse. The correspondence between the five above-mentioned levels, the data previously transmitted, and the effective binary value of the received signal is shown by the following chart K:

| | Level | Data Value |
|---|---|---|
| K | (1) $+V_0$ | 1 |
| | (2) $+V_0/2$ | 1 except when previous two data are 1 |
| | (3) 0 | 1 whenever previous data is 0, 0 whenever previous data is 1 |
| | (4) $-V_0/2$ | 0 except when previous two data are 0 |
| | (5) $-V_0$ | 0 |

Figures 3, 4:
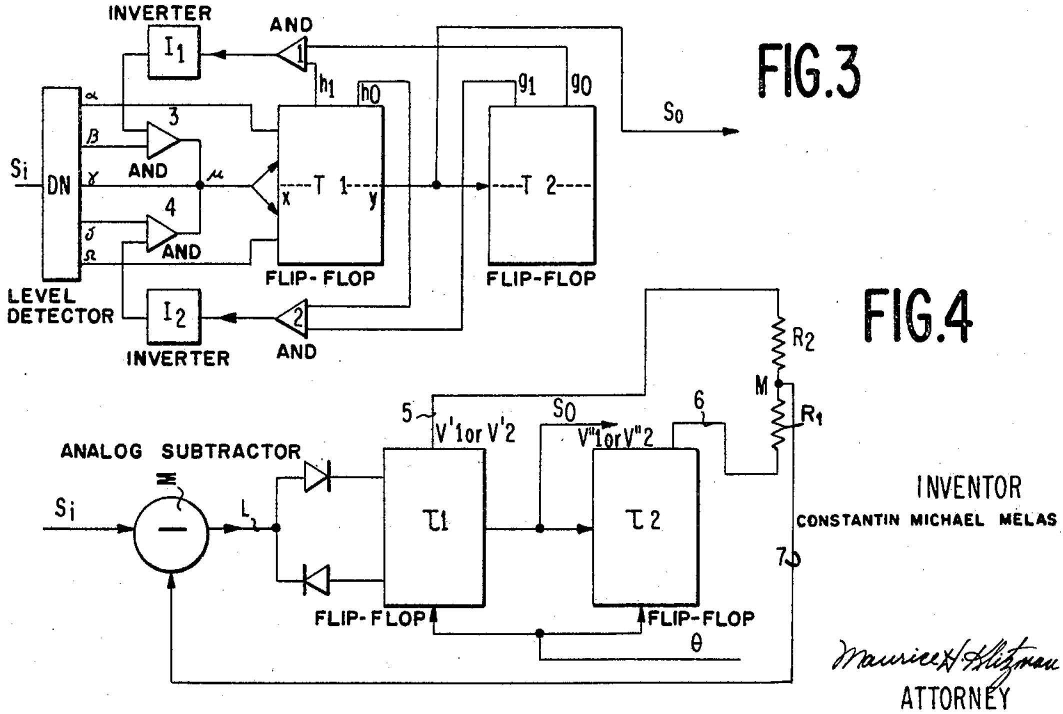
FIG. 3 is a block diagram of one embodiment of the invention utilizing logic gating means for signal detection.
FIG. 4 is a block diagram of a further embodiment of the invention utilizing analog techniques for signal detection.

Referring now to FIG. 3, one embodiment of the invention is shown which basically comprises a threshold detector DN, two flip-flops $T_1$ and $T_2$ which form a two position shift register, two inverters $I_1$ and $I_2$ and four AND circuits 1, 2, 3, and 4. Line *xy* is shown for purposes of illustration. Control signals into flip-flop $T_1$ drawn above line *xy* will trigger the flip-flop to conventional position 1 while those below the line *xy* will trigger the flip-flop $T_1$ to conventional position 0. The signal to be detected, $S_i$, is applied through level detector DN. Level detector DN supplies an output through one of the wires $\alpha$, $\beta$, $\gamma$, $\delta$, or $\Omega$ depending upon the signal level $S_i$.

Flip-flops $T_1$ and $T_2$ store the effective binary value of the last two information pulses previously transmitted. As soon as a signal appears through any one of the wires $\alpha$, $\beta$, $\gamma$, $\delta$, or $\Omega$, flip-flop $T_1$ assumes a position dependent on the signal and on the position occupied by itself and by flip-flop $T_2$ at that instant. Simultaneously, the value found in flip-flop $T_1$ is conveyed to flip-flop $T_2$.

According to chart K, the signal $S_i$ may have one of five different input levels, $+V_0$, $+V_0/2$, 0, $-V_0/2$, $-V_0$. Operation of the circuit shown in FIG. 3 will now be traced for each different input level.

Should the signal $S_i$ be of level $+V_0$, then detector DN furnishes a signal to wire $\alpha$ and flip-flop $T_1$ triggers to conventional position 1, or remains there if already there. Should the signal $S_i$ be of level $-V_0$, the detector DN furnishes a signal to wire $\Omega$ and flip-flop $T_1$ triggers to 0 or stays there if previously there.

If the signal $S_i$ is of level 0, then detector DN furnishes a signal to wire $\gamma$. This signal will trigger flip-flop $T_1$ to position 1 if trigger $T_1$ was storing a 0 or to position 0 if flip-flop $T_1$ was storing a 1 in accordance with line 3 of chart K.

If the signal level $S_i$ is of level $+V_0/2$, then detector DN furnishes an output signal to wire $\beta$. According to line 2 of chart K, this will cause flip-flop $T_1$ to assume position 1 except in the case where the previous two data as retained by flip-flops $T_1$ and $T_2$ are 1 wherein flip-flop $T_1$ will then be positioned to 0. Hence, if the last-received data has the value 1 and the one before last, the value 0, flip-flops $T_1$ and $T_2$ will be positioned accordingly; and outputs $h_1$ of flip-flop $T_1$ and $g_0$ of flip-flop $T_2$ will emit signals that cause AND circuit 1 to deliver a signal to inverter circuit $I_1$ which will prevent AND circuit 3 from being gated. Thus, the voltage on line $\beta$ will not reach the point $\mu$ and flip-flop $T_1$ will not receive a control signal and thus remain at position 1. Should the last received data be of value 0, and the one before that of value 1 or 0, a similar consideration will show that inverter $I_1$ wil not receive an input from AND circuit 1 because of the lack of a signal at $h_1$. This will cause AND circuit 3 to be gated by the output signal of inverter circuit $I_1$, hence allowing the signal on line $\beta$ to control flip-flop $T_1$ through point $\mu$ and trigger it to position 1 from position 0. Should the last received data be of value 1, and the one before that of value 1, the inverter $I_1$ will not be gated by AND circuit 1 because of the lack of a signal at $g_0$. This again causes AND circuit 3 to be gated by the inverter $I_1$. In this case, the signal appearing on line $\beta$ will be gated through point $\mu$ where it will cause flip-flop $T_1$ to change from a 1 to a 0.

Whenever the signal $S_i$ is of value $-V_0/2$, then according to line 4 of chart K the effective binary value is 0 except when the previous two data are 0. A signal of this value causes detector DN to furnish an output signal to wire $\delta$. Hence, if the last-received data has the value 0, and the one before last the value 1, flip-flops $T_1$ and $T_2$ will be positioned accordingly; and outputs $h_0$ of flip-flops $T_1$ and $g_0$ of flip-flop $T_2$ will emit signals that cause AND circuit to deliver a signal to inverter circuit $I_2$ which will thus prevent AND circuit 4 from being gated. Thus the signal on line $\delta$ will not reach the point $\mu$ and flip-flop $T_1$ will not receive a control signal and thus remain at position 0. Should the last-received data be of value 1, and the one before that of value 1 or 0, a similar consideration will show that inverter $I_2$ will not receive an input from AND circuit 2 because of the lack of a signal at $h_0$. This will allow AND circuit 4 to be gated by the output signal of inverter $I_2$, hence allowing the signal on line $\delta$ to trigger flip-flop $T_1$ to position 0. Should the last two data be value 0, once again inverter $I_2$ gates AND circuit 4 allowing signal $\delta$ to be transmitted to point M, thereby triggering flip-flop $T_1$ to position 1 from position 0.

It can be seen that trigger $T_1$ assumes position 1 whenever the information value of the signal received is a binary 1 and position 0 when the information value is a binary 0. Thus, binary information sent at a rate greater than Nyquist speed is recovered. While this embodiment has been illustrated for transmission speeds of two times Nyquist speed, it is apparent that detection of signals transmitted at N times Nyquist speed is obtainable by storing the N previous data sent in an N position shift register and utilizing gating circuits for gating $1+2^N$ detected significant signal levels. Furthermore, it is apparent that this embodiment operates correctly for transmission speeds less than Nyquist speed wherein binary pulses are received.

Referring now to FIG. 4, a second embodiment of the present invention is shown. This embodiment will also be described for easier understanding, for the case where the transmission speed is 2 times the Nyquist transmission speed. The above statements relating to the resulting signal shapes at this transmission speed as well as the various conditions and correspondances illustrated by chart K will be referred to.

Referring once again to FIG. 1, and in particular to plot $C_3$, it can be seen that the received signal is characterized by the following points:

(1) If the values of the previous two data are 1:

(a) The received signal reaches level $+V_0$ if the data transmitted by the received signal is of value 1.

(b) The received signal will at the most reach level $+V_0/2$ if the data transmitted by the received signal is of value 0.

In order to find out of the received data is either 1 or 0, it sufficies to know if the received signal is greater or smaller than $V_1$ where $V_0/2<V_1<V_0$.

(2) If values of the previous two data are 1 for the last data and 0 for the one before the last data:

(a) The received signal reaches at least level $V_0/2$ if the data transmitted by the received signal is of value 1, (b) The received signal will at the most reach level 0 if the data transmitted by the received signal is of value 0.

In order to find out if the received data is either 1 or 0, it sufficies to know if the received signal is greater or smaller than $V_2$ with $0<V_2<V_0/2$.

(3) If the values of the previous two data are 0 for the last one and 1 for the one before last:

(a) The received signal reaches at least level 0 if the data transmitted by the received signal is of value 1, (b) The received signal reaches at the most level $-V_0/2$ if the data transmitted by the received signal is 0.

In order to find out if the received data is either 1 or 0, it sufficies to know if the received signal is greater or smaller than $V_3$ with $-V_0/2<V_3<0$.

(4) If the values of the previous two data are 0:

(a) The received signal reaches at least the level $-V_0/2$ if the data transmitted by the received signal is of value 1, (b) The received signal reaches level $-V_0$ if the data transmitted by the received signal is of value 0.

In order to find out if the received data is either 1 or 0, it sufficies to know if the received signal is greater or smaller than $V_4$ with $-V_0<V_4<V_0/2$.

Referring once again to FIG. 4, it can be seen that this embodiment comprises two flip-flops $\tau_1$ and $\tau_2$ which form a two position shift register, two resistors $R_1$ and $R_2$ and an analog subtractor $\Sigma$ fed by signal $S_i$ and by the signal from the node point M between resistors $R_1$ and $R_2$. A clock pulse on line $\theta$ enables control of triggers $\tau_1$ and $\tau_2$ at message characteristic times $t_i$. This clock pulse can be derived from the input data as shown in the copending application Ser. No. 486,085 by Jean Lemiere and Constantin M. Melas assigned to the assignee of the present application filed this same day entitled "Synchronized Clock Generator." Flip-flops $\tau_1$ and $\tau_2$ will position themselves according to the data values 0 or 1 that they store. $\tau_1$ emits through wire 5 a voltage $V'_1$ or $V'_2$ according to the data value 1 or 0 that it stores. Likewise, $\tau_2$ emits either voltage $V''_1$ or $V''_2$ through wire 6. If, for example, $R_1$ is equal to $R_2$, voltage $V_M$ at node point M is then:

$$V_M=\frac{V'_1+V'_2}{2} \text{ if data stored in } \tau_1 \text{ is 1 and data stored in } \tau_2 \text{ is 1,}$$

$$V_M=\frac{V'_1+V''_2}{2} \text{ if data stored in } \tau_1 \text{ is 1 and data stored in } \tau_2 \text{ is 0,}$$

$$V_M=\frac{V'_2+V''_1}{2} \text{ if data stored in } \tau_1 \text{ is 0 and data stored in } \tau_2 \text{ is 1,}$$

$$V_M=\frac{V'_2+V''_2}{2} \text{ if data stored in } \tau_1 \text{ is 0 and data stored in } \tau_2 \text{ is 0.}$$

It is possible to choose $V'_1$, $V'_2$, $V''_1$, and $V''_2$ so as to have various potentials of $V_M$ chosen respectively as the above-defined potentials $V_1$, $V_2$, $V_3$, and $V_4$. An example of such a choice is:

$$V'_1=V_0,\ V'_2=-V_0,\ V''_1=V_0/2,\ V''_2=-V_0/2$$

In these conditions, voltage $V_M$ at node point M for the four cases above-mentioned will be: ¾ $V_0$, ¼ $V_0$, −¼ $V_0$, and −¾ $V_0$, respectively, therefore, fully satisfying the imposed requisites to $V_1$, $V_2$, $V_3$, and $V_4$. Hence, these voltages may be chosen as values for each of the four potentials.

Figure 2:
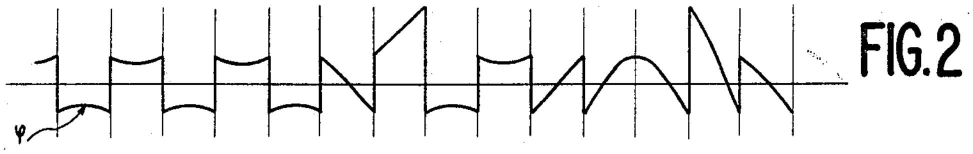
FIG. 2 is the signal waveform at the output of $\Sigma$ of FIG. 4.

Wire 7 transmits the voltage $V_M$ at node point M to the analog subtractor $\Sigma$ whose other input is fed by signal $S_i$. Signal $S_i$ is thus being compared at each time $t_i$ to a reference voltage level $V_R=V_M$ which is a function of the last two data values received and in accordance with the requisites imposed on reference voltages $V_1$, $V_2$, $V_3$, and $V_4$. As was previously seen in each case, the data transmitted by the signal $S_i$ is 1 if the signal level $S_i$ is higher than the reference level $V_R$ and the data is 0 if the signal level $S_i$ is smaller than the reference voltage level $V_R$. The analog subtractor $\Sigma$ sends through wire $\iota$ in each case a positive signal if the signal $S_i$ is higher than $V_R$, and a negative signal if the level of signal $S_i$ is smaller than $V_R$. In the first case, flip-flop $\tau_1$ is triggered to or maintained at 1. In the second case, flip-flop $\tau_1$ is triggered to or maintained at 0. The incoming data is then registered in $\tau_1$ which conveys its previous content to $\tau_2$. Referring now to FIG. 2, an output waveform $\varphi$ is shown which corresponds to the output of the analog subtractor $\Sigma$ when the wave transmitted is as in FIG. 1. It is readily apparent that the extreme values of wavefore $\varphi$ correspond on a binary basis to the binary values transmitted as shown in plot $C_1$ at the characteristic times $t_i$.

The general remarks made during the signal study and operation of the described devices, show that the received signal will be accurately identified even though its shape is slightly modified with respect to normal. Thus, for example, the signal represented by plot $C'_3$ of FIG. 1 is entirely equivalent to the signal represented by plot $C_3$. The transmission technique is then practically insensitive to distortions which might be brought about by the transmission channel.

While the invention has been particularly shown and described with reference to preferred embodiments thereof, it will be understood by those skilled in the art that various changes in form and detail may be made therein without departing from the spirit and scope of the invention.

What is claimed is:

1. A method of transmitting and receiving telegraph signals at an information transfer rate N times greater than Nyquist rate where N is an integer value equal to or greater than 2, comprising the steps of:

transmitting at a rate of N times Nyquist rate the information to be received in pulse form;

receiving said data and comparing each received pulse with the effective binary value of only the N pulses preceding it in order to determine the effective binary value of each received pulse;

storing the effective binary value of the received pulse.

2. A method for transmitting and receiving telegraph signals at an information transfer rate N times greater than Nyquist rate where N is an integer value equal to or greater than 2, comprising the steps of:

transmitting at a rate of N times Nyquist rate the information to be received in pulse form;

receiving data waveforms containing a plurality of multi-level pulses having $2^N+1$ significant levels which are representations of the transmitted data;

comparing each received pulse with a threshold signal whose value is representative of the effective binary value of the N pulses preceding the received pulse;

detecting the received pulse as a binary 1 or as a binary 0 in accordance with the comparison made between the rereived pulse and said threshold signal;

storing the effective binary value of the received pulse as the last received pulse and retaining N−1 pulses preceding the received pulse.

3. In combination, transmitting means for transmiting pulse information at a rate N times the Nyquist rate of a communication channel and receiving means for detecting the effective binary values of pulses transmitted through a communication channel at a speed of N times greater than Nyquist rate where N is an integer value equal to or greater than 2, said receiving means including:

storage means for retaining the effective binary values of only the N pulses preceding the pulse to be detected, said storage means providing an output signal representative of effective binary values retained;

comparing means for comparing the pulse to be detected with the output signal of said storage means;

detecting means responsive to said comparing means for detecting the effective binary value of said pulse to be detected.

4. In combination, transmitting means for transmitting pulse information at a rate N times the Nyquist rate of a comunication channel and receiving means for detecting the effective binary values of pulses transmitted through a communication channel at a speed of N times greater than Nyquist rate where N is an integer value equal to or greater than 2, said receiving means including:

an N position shift register for storing the effective binary values of N pulses preceding the pulse to be detected;

a resistance network connected to the N position shift register having a node point which has $2^N$ discrete reference voltage levels, the reference voltage level at any particular time being representative of the effective binary values stored in said N position shift register;

an analog subtractor responsive to the reference voltage level at said node point and to the pulse to be detected having an output which is an algebraic function of the comparison between the pulse to be detected and the reference voltage level at said node point, said output being a binary pulse whose level is related to the binary value of the pulse transmitted.

5. In combination, transmitting means for transmitting pulse information at a rate N times the Nyquist rate of a communication channel and receiving means for detecting the effective binary values of pulses transmitted through a communication channel at a rate N times greater than Nyquist rate where N is an integer value equal to or greater than 2, said receiving means including:

a shift register having N binary positions for retaining the effective binary values of N pulses preceding the pulse to be detected, said shift register having plural outputs representative of the effective binary values stored;

a threshold level detector for detecting $1+2^N$ significant levels of the multi-level pulse source and having $1+2^N$ discrete outputs which are representative of the pulse to be detected;

logic gating means connected to the outputs of said threshold level detector and connected to said plural outputs of said shift register which enable the effective binary value of the pulse to be detected to be stored in the first position of said shift register, each position of said shift register being shifted at the same time.

6. In combination, transmitting means for transmitting pulse information at a rate N times the Nyquist rate of a communication channel and receiving means for detecting the effective binary values of pulses transmitted through a communication channel at a speed two times greater than Nyquist rate, said receiving means including:

a shift register having two binary positions for retaining the effective binary values of the two pulses preceding the pulse to be detected, said shift register having plural outputs representative of the effective binary values stored;

a threshold level detector for detecting five significant levels of the multi-level pulse source and having five discrete outputs any one of which is activated in accordance with the pulse to be detected;

logic gating means connected to the outputs of said threshold level detector and connected to said plural outputs of said shift register enabling the activated output of said threshold level detector to be detected as a binary 1 or as a binary 0, depending upon the values previously stored in said shift register, said logic gating means gating the first position of said shift register to store the effective binary value of the pulse detected and enabling the second position of said shift register to store the effective binary value of the pulse previously stored in said first position.

References Cited

UNITED STATES PATENTS

| | | | |
|---|---|---|---|
| 3,388,330 | 6/1968 | Kretzmer | 325—42 |
| 2,701,274 | 2/1955 | Oliver | 325—38 X |
| 3,146,424 | 8/1964 | Peterson et al. | 178—88 |
| 3,343,125 | 9/1967 | Lender | 325—41 |
| 3,344,353 | 9/1967 | Wilcox | 325—41 |
| 3,230,310 | 1/1966 | Brogle | 178—68 |
| 3,238,299 | 3/1966 | Lender | 178—68 |

ROBERT L. GRIFFIN, Primary Examiner

WILLIAM S. FROMMER, Assistant Examiner

U.S. Cl. X.R.

178—68; 325—323